US008404305B2

(12) United States Patent
Patoux et al.

(10) Patent No.: US 8,404,305 B2
(45) Date of Patent: Mar. 26, 2013

(54) SYNTHESIS OF A LIMPO$_4$ COMPOUND AND USE AS ELECTRODE MATERIAL IN A LITHIUM STORAGE BATTERY

(75) Inventors: Sebastian Patoux, Fontaine (FR); Carole Pagano, Saint Ismier (FR); Carole Bourbon, Saint-Michel de Saint-Geoirs (FR); Frederic Le Cras, Notre Dame de l'Osier (FR)

(73) Assignee: Commissariat a l'Energie Atomique, Paris (FR)

( * ) Notice: Subject to any disclaimer, the term of this patent is extended or adjusted under 35 U.S.C. 154(b) by 740 days.

(21) Appl. No.: 12/449,588

(22) PCT Filed: Mar. 12, 2008

(86) PCT No.: PCT/FR2008/000322
§ 371 (c)(1),
(2), (4) Date: Aug. 14, 2009

(87) PCT Pub. No.: WO2008/132336
PCT Pub. Date: Nov. 6, 2008

(65) Prior Publication Data
US 2010/0028676 A1 Feb. 4, 2010

(30) Foreign Application Priority Data

Mar. 14, 2007 (FR) ..................................... 07 01847

(51) Int. Cl.
*B32B 5/16* (2006.01)
(52) U.S. Cl. ..................... 427/212; 423/179; 423/179.5; 423/594.15; 423/641; 428/402
(58) Field of Classification Search .................. 428/402, 428/403; 427/212; 423/179, 179.5, 594.15 423/641
See application file for complete search history.

(56) References Cited

U.S. PATENT DOCUMENTS

| | | | |
|---|---|---|---|
| 7,754,384 B2 * | 7/2010 | Patoux et al. ................. | 429/223 |
| 7,879,264 B2 * | 2/2011 | Patoux et al. ............. | 252/520.2 |
| 2007/0031732 A1 | 2/2007 | Chiang et al. | |

FOREIGN PATENT DOCUMENTS

| | | |
|---|---|---|
| JP | A-2006-56754 | 3/2006 |
| JP | A2006/56754 * | 3/2006 |
| WO | WO 2006/105848 A2 | 10/2006 |

OTHER PUBLICATIONS

Li et al., "Preparation and Characterization of LiFePO4 . . . " JOES, vol. 153, No. 9, 2006, pp. F194-F198.*
Grigorova et al., "Thermodynamical control of the grain size of LiCoPO$_4$ powders," *Journal of Physics and Chemistry of Solids*, vol. 66, 2005, pp. 1598-1608.
Li et al., "Preparation and Characterization of LiFePO$_4$ from a Novel Precursor of NH$_4$FePO$_4$•H$_2$O," *Journal of the Electrochemical Society*, vol. 153, No. 9, 2006, pp. F194-F198.
Wang et al., "High-Rate LiFePO$_4$ Electrode Material Synthesized by a Novel Route from FePO$_4$•4H$_2$O," *Advanced Functional Materials*, vol. 16, 2006, pp. 2135-2140.
Kim et al., "A modified mechanical activation synthesis for carbon-coated LiFePO$_4$ cathode in lithium batteries," *Material Letters*, vol. 61, 2007, pp. 3822-3825.
Arnold et al., "Fine-particle lithium iron phosphate LiFePO$_4$ synthesized by a new low-cost aqueous precipitation technique," *Journal of Power Sources*, vol. 119-121, 2003, pp. 247-251.
Tajimi et al., "Enhanced electrochemical performance of LiFePO$_4$ prepared by hydrothermal reaction," *Solid State Ionics*, vol. 175, 2004, pp. 287-290.
Franger et al., "Comparison between different LiFePO$_4$ synthesis routes and their influence on its physico-chemical properties," *Journal of Power Sources*, vol. 119-121, 2003, pp. 252-257.
Rabanal et al., "Improved electrode characteristics of olivine-LiCoPO$_4$ processed by high energy milling," *Journal of Power Sources*, vol. 160, 2006, pp. 523-528.
Kishore et al., "Influence of isovalent ion substitution on the electrochemical performance of LiCoPO$_4$," *Materials Research Bulletin*, vol. 40, 2005, pp. 1705-1712.
Wolfenstine et al., "Effect of oxygen partial pressure on the discharge capacity of LiCoPO$_4$," *Journal of Power Sources*, vol. 144, 2005, pp. 226-230.

* cited by examiner

*Primary Examiner* — Leszek Kiliman
(74) *Attorney, Agent, or Firm* — Oliff & Berridge, PLC

(57) ABSTRACT

The LiMPO$_4$ compound is synthesized by reacting a compound of general formula XMPO$_4$, nH$_2$O where X represents a radical selected from —NH$_4$ and —H and M is a transition metal selected from Co, Ni and Mn, with a lithium source such as lithium nitrate, at a temperature lower than or equal to 350° C. The XMPO$_4$, nH$_2$O compound further exhibits a particular morphology in the form of platelets that is preserved during the reaction between the two precursors. The LiMPO$_4$ compound thus synthesized is advantageously used as active material of an electrode for a lithium storage battery.

10 Claims, 4 Drawing Sheets

SYNTHESIS OF A LIMPO$_4$ COMPOUND AND USE AS ELECTRODE MATERIAL IN A LITHIUM STORAGE BATTERY

BACKGROUND OF THE INVENTION

The invention relates to LiMPO$_4$ compounds and their derivatives, M being a transition metal selected from the group formed by cobalt, nickel and manganese, to use of the latter as electrode material in a lithium storage battery and to synthesis thereof.

STATE OF THE ART

Lithium storage batteries are tending to replace nickel-cadmium (Ni—Cd) or metal nickel-hydride (Ni-MH) batteries as autonomous power source, in particular in portable equipment. This tendency can be explained by the continuous improvement of the performances of lithium storage batteries giving them substantially higher mass and volume energy densities than those of Ni—Cd and Ni-MH batteries. Thus, whereas the first lithium storage batteries of Li-ion type had a mass energy density of about 85 Wh/kg, a mass energy density of about 200 Wh/kg can currently be obtained. For comparison purposes, Ni-MH storage batteries and Ni—Cd storage batteries respectively have a mass energy density of 100 Wh/kg and 50 Wh/kg.

The active materials used in the lithium storage batteries marketed at the present time are, for the positive electrode, lamellar compounds such as LiCoO$_2$, LiNiO$_2$ and mixed oxides Li(Ni, Co, Mn, Al)O$_2$ or compounds of spinelle structure having a composition close to that of LiMn$_2$O$_4$. The negative electrode is generally made from carbon (graphite, coke, etc.) or possibly from a Li$_4$Ti$_5$O$_{12}$ spinelle or from a metal forming an alloy with lithium (Sn, Si, etc.). The theoretical and practical capacities per unit mass of these compounds, for an operating voltage with respect to metallic lithium of about 4 Volts, are respectively 275 mAh/g and 140 mAh/g for LiCoO$_2$ and LiNiO$_2$ and 148 mAh/g and 120 mAh/g for LiMn$_2$O$_4$.

Since the emergence of lithium storage batteries, several generations of positive electrode materials have successively appeared on the market. Moreover, new generations of lithium storage batteries are already being developed for increasingly diversified applications such as the field of hybrid or electric automobiles, energy storage in photovoltaic cells, and so on. However, to meet the ever-increasing energy demands (per unit mass and/or volume), it is indispensable to come up with active lithium insertion materials with even better performances.

For several years now, materials of three-dimensional structure constructed from polyanionic entities of XO$_n^{m-}$ type, with X=P, S, Mo, W etc. have been arousing a real interest in the field of lithium storage batteries, and more particularly orthophosphates of olivine structure and general formula LiMPO$_4$, with M=Fe, Mn, Co, Ni.

Among the four compounds of LiMPO$_4$ formula, only lithiated iron phosphate, LiFePO$_4$, is currently capable of meeting requirements experimentally, on account of a practical specific capacity that is henceforth close to the theoretical value, i.e. 170 mAh/g. Nevertheless, this compound, based on implementation of the electrochemical couple Fe$^{3+}$/Fe$^{2+}$, functions at a potential of 3.4 V vs. Li$^+$/Li, which implies a maximum specific mass energy density of 580 Wh/kg. Manganese, cobalt and nickel orthophosphates, isotypes of LiFePO$_4$, are known for presenting higher lithium ion extraction/insertion potentials, respectively 4.1 V, 4.8 V and 5.1 V vs. Li$^+$/Li, and the theoretical specific capacities of these three compounds are close to that of LiFePO$_4$. However, a great deal of progress remains to be made from an experimental point of view to obtain satisfactory practical specific capacity values.

For example purposes, in the article "Improved electrode characteristics of olivine-LiCoPO$_4$ processed by high energy milling" (Journal of Power Sources, 160 (2006) 523-528), M. E. Rabanal et al. report that lithium can be reversibly extracted from the LiCoPO$_4$ compound of olivine structure at an electrochemical lithium extraction/insertion potential of about 4.8 V vs. Li$^+$/Li and that the theoretical specific capacity of this compound is about 167 mAh/g. However, the practical specific capacity of LiCoPO$_4$ reported in the literature is relatively poor. Moreover, the electrochemical curve of lithium ion extraction/insertion in LiCoPO$_4$ shows a very large polarization, mainly due to the weak electronic and/or ionic conductivity of the material. For example purposes, in the article by M. E. Rabanal et al., the specific capacity on first discharge, under C/10 conditions, is disappointing (104 mAh/g) and a rapid loss of the practical specific capacity is observed during cycling. The LiCoPO$_4$ compound was obtained by a reaction process in solid state at high temperature. A stoichiometric mixture of Li$_2$CO$_3$, CO$_3$O$_4$ and (NH$_4$)$_2$HPO$_4$ is thus ground and calcinated in air at 350° C. for 12 hours. After cooling, the mixture of oxides is pressed into the form of a pellet and annealed at high temperature (750° C.) for 24 hours in air. The product is then ground and heat-treated at 350° C. for 9 hours to ensure the homogeneity and purity of the final LiCoPO$_4$ product.

To improve the electrochemical performances and in particular the electronic conductivity of LiCoPO$_4$, it is commonplace to reduce the size of the LiCoPO$_4$ particles and to deposit carbon on the surface of said particles. M. E. Rabanal et al. thus propose to improve the electronic conductivity of LiCoPO$_4$ and therefore to reduce the polarization of the storage battery by reducing the size of the LiCoPO$_4$ particles by milling for 30 minutes and by mixing said particles with a large quantity of carbon (0.8 to 20% by weight).

However, despite the use of carbon, the electrochemical performances of LiCoPO$_4$ prepared by the conventional synthesis process remain mediocre. For example, Satya Kishore et al., in the article "Influence of isovalent ion substitution on the electrochemical performance of LiCoPO$_4$" (Materials Research Bulletin, 40 (2005) 1705-1712), obtain a specific capacity at first discharge of 125 mAh/g of LiCoPO$_4$. For this, a very large quantity of carbon (45% by weight) was used. However, only 60 mAh/g are output after ten charging/discharging cycles. Thus, although carbon enables the initial capacity at first discharge to be increased, the practical specific capacity obtained after several charging and discharging cycles is not improved by the presence of carbon. Furthermore, a large quantity of carbon greatly penalizes the mass and volume energy densities of the electrode, and therefore of the storage battery.

Finally, J. Wolfenstine et al., in the article "Effect of oxygen partial pressure on the discharge capacity of LiCoPO$_4$" (Journal of Power Sources, 144 (2005) 226-230) studied the effect on the discharge capacity of LiCoPO$_4$ of a synthesis of said compound by reaction in solid state at high temperature performed in an argon atmosphere, in air or in oxygen and with precursors at least one of which contains carbon. The LiCoPO$_4$ compound prepared in an argon atmosphere exhibits better electrochemical performances, which do however remain low (about 100 mAh/g on first discharge).

OBJECT OF THE INVENTION

The object of the invention is to provide a synthesis method whereby a LiMPO$_4$ compound or a compound of one of its derivatives can be obtained, where M is a transition metal selected from Co, Ni and Mn and advantageously cobalt and exhibiting improved electrochemical performances. More particularly, the object of the invention is to provide a synthesis method whereby a $LiMPO_4$ compound or a compound of one of its derivatives can be obtained presenting a weak electrochemical polarization and an output specific capacity on high discharge.

According to the invention, this object is achieved by the following claims.

More particularly, this object is achieved by the fact that the method comprises at least one step consisting in making lithium nitrate react with a solid precursor formed by $XMPO_4$, $nH_2O$ or one of its derivatives and in which —X represents a radical selected from —$NH_4$ and —H and n represents the number of water molecules associated with an $XMPO_4$ entity, at a temperature lower than or equal to 350° C.

It is a further object of the invention to provide a $LiMPO_4$ compound or one of its derivatives, M being a transition metal selected from the group formed by Co, Ni and Mn, and advantageously cobalt, said compound exhibiting improved electrochemical performances compared with the prior art.

According to the invention, this object is achieved by the fact that the compound presents a BET specific surface greater than or equal to 5 $m^2 \cdot g^{-1}$ and by the fact that it consists of particles that are hardly agglomerated formed by platelets.

A still further object of the invention is the use of such compounds as active material of an electrode for a lithium storage battery and preferably for a Li-Ion type lithium storage battery.

BRIEF DESCRIPTION OF THE DRAWINGS

Other advantages and features will become more clearly apparent from the following description of particular embodiments of the invention, given as non-restrictive examples only and represented in the accompanying drawings in which.

DESCRIPTION OF PARTICULAR EMBODIMENTS

Figure 1:
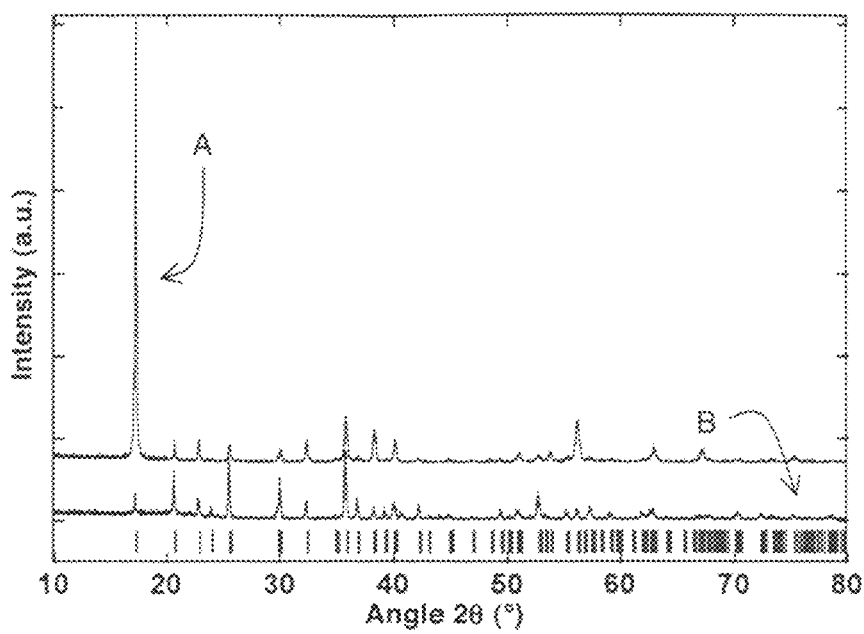
FIG. 1 is a graph representing the X-ray diffraction diagrams ($\lambda_{CuK\alpha}$) of two compounds of $LiCoPO_4$ formula respectively prepared according to a particular embodiment of the invention and according to a synthesis method of the prior art.

According to a particular embodiment, the $LiCoPO_4$ compound is synthesized by making two precursors react at low temperature, i.e. at a temperature lower than or equal to 350° C. and advantageously at a temperature of about 300° C., for example 300° C.±10° C.

The first precursor is a solid precursor, a source both of cobalt and of the $PO_4^{3-}$ polyanionic entities. It is formed by the compound of general formula $XCoPO_4$, $n\,H_2O$. X represents a radical selected from —$NH_4$ and —H and n represents the number of water molecules associated with an $XCoPO_4$ entity. n is more particularly comprised between 0 and 9 and preferably between 0 and 2. Moreover, the first precursor presents a particular morphology in the form of platelets. What is meant by form of platelets is a flattened volume, i.e. a volume presenting one dimension, more particularly its thickness, which is much smaller than the other dimensions. The cross-section of such a volume is preferably substantially square or rectangular.

The first precursor is advantageously obtained by precipitation when a first water-soluble reagent comprising cobalt is added in an aqueous solution comprising a phosphorus-base second water-soluble reagent. The first reagent is advantageously selected from cobalt acetate, cobalt oxalate and cobalt nitrate, whereas the second reagent is selected from $(NH_4)_2HPO_4$ and $NH_4H_2PO_4$. The solid first precursor is for example obtained by adding an aqueous solution comprising cobalt drop by drop to an aqueous solution comprising phosphorus. The reaction between the two aqueous solutions produces a precipitate which is then recovered and dried. Drying is for example performed in an oven in air to evaporate the non-structural water. The concentration and pH of the first and second reagents can be controlled to enable formation of the precipitate. Furthermore, the precipitation reaction is preferably performed at ambient temperature. Finally, the size of the grains of the product obtained after drying the precipitate can be controlled by adjusting the concentration of the aqueous solutions and the pH of the reaction medium. For example, a large oversaturation of phosphorus increases the nucleation rate of the precipitate to the detriment of its growth so that the particles are smaller, which may be beneficial for forming $LiCoPO_4$ particles.

To obtain the $LiCoPO_4$ compound, the solid first precursor is reacted with a second precursor forming a lithium source, so as to substitute the —X element by the —Li element in the $XCoPO_4$ compound. The second precursor is lithium nitrate ($LiNO_3$). The second precursor, which is solid at ambient temperature, presents indeed the advantage of having a melting point at a temperature of 255° C. It therefore presents itself in liquid state when the reaction with the first precursor takes place, i.e. at a temperature lower than or equal to 350° C. and preferably about 300° C., which makes for a better diffusion when the reaction takes place between the lithium nitrate and the solid first precursor. The solid first precursor is for example added to the second precursor in a crucible and the whole is subjected to heat treatment performed at a temperature lower than or equal to 350° C. and preferably of about 300° C.

Heat treatment is advantageously performed in air for a short duration for example comprised between one hour and two and a half hours. It can also be performed in an inert atmosphere, for example in the presence of argon or nitrogen.

The solid residue recovered in the crucible is then preferably washed with distilled water and dried to separate the $LiCoPO_4$ compound from the other products originating from the reaction and to purify it. Drying is preferably performed in air, at a temperature comprised between about 50° C. and about 100° C.

The reaction between the two precursors is advantageously performed with an excess of lithium. More particularly, the quantity of second precursor involved in said reaction is calculated to obtain an excess of lithium compared with the stoichiometric quantity necessary for obtaining the $LiCoPO_4$ compound. The excess of lithium is for example from 5 to 50 times greater than the necessary stoichiometric quantity.

A synthesis method according to the present invention enables a $LiCoPO_4$ compound of olivine structure to be obtained but with a particular form of particles, different from that obtained by a synthesis method in solid state performed at high temperature. It has indeed surprisingly been observed that the $LiCoPO_4$ compound obtained by reacting two precursors comprising cobalt and phosphorus on the one hand and lithium on the other hand at a temperature lower than or equal to 350° C., is in the form of solid particles:
that are very slightly or not at all agglomerated,
and presenting the same morphology as that of the solid first precursor, i.e. in the form of platelets, with preferably a substantially square or rectangular cross-section with sides having a dimension of about a few micrometers and a thickness comprised between 10 nm and 1 μm depending on the synthesis conditions.

Furthermore, the compound has a specific surface measured by the Brunauer-Emmett-Teller (BET) method greater than or equal to $5\ m^2 \cdot g^{-1}$ and the particles of said compound are advantageously porous.

According to a particular example, the $LiCoPO_4$ compound was produced by making $NH_4CoPO_4, nH_2O$ react with lithium nitrate ($LiNO_3$) at low temperature. More particularly, the $NH_4CoPO_4, nH_2O$ precursor was synthesized by precipitation in an aqueous solution. A first aqueous solution is produced by dissolving 13.206 g of diammonium hydrogen phosphate (($NH_4)_2HPO_4$) in 0.1 L of distilled water. The phosphorus concentration in said first aqueous solution is then 1 mol/L. The first solution is then placed under magnetic stirring. Then a second aqueous solution formed by a cobalt acetate solution with a cobalt concentration of 0.5 mol/L is added drop by drop to the first solution. The final solution, which is colourless, then contains a pink precipitate. The latter is washed, centrifuged and dried for 24 hours at 55° C., which enables a magenta-coloured powder to be obtained which, once analyzed, reveals the following composition: $NH_4CoPO_4, nH_2O$ with n substantially equal to 1.

3.7 g de $NH_4CoPO_4, nH_2O$ are then placed in a porcelain crucible containing 40.3 g of lithium nitrate ($LiNO_3$). The crucible is placed in an oven the temperature of which quickly reaches 300° C. After two hours of heat treatment, the oven heating is stopped and the crucible is removed. The solid residue is copiously washed with distilled water to dissolve and remove the by-products, and the powder obtained is then dried at 55° C. for 12 hours.

As represented in FIG. 1, this powder was analyzed by X-ray diffraction. The X-ray diffraction spectrum of said powder (curve plot A) was further compared with that (curve plot B) of a conventional $LiCoPO_4$ compound obtained by a conventional synthesis method (high temperature).

Figure 2:
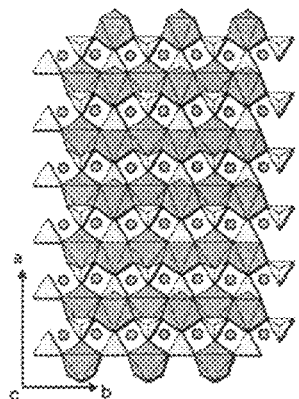
FIG. 2 represents the crystallographic structure of $LiCoPO_4$ in the plane (a, b).

The comparison between plots A and B enables it to be observed that the composition of the powder obtained in the particular example mentioned above corresponds to that of the $LiCoPO_4$ compound. Like the $LiCoPO_4$ compounds obtained in accordance with the prior art, it presents an olivine structure such as that schematized in the plane (a, b) in FIG. 2. This structure consists of a compact hexagonal stacking of oxygen atoms, the lithium ions being represented by circles in FIG. 2 and the cobalt ions being located in a half of the octahedric sites whereas the phosphorus occupies ⅛ of the tetrahedric sites. The octahedra represented in FIG. 2 thus correspond to the cobalt bonded to 6 oxygen atoms ($CoO_6$) and the tetrahedra represented in FIG. 2 correspond to the phosphorus bonded to 4 oxygen atoms ($PO_4$). The discrete lines of plots A and B represented in FIG. 1 indicate that the two $LiCoPO_4$ compounds crystallize in the Pnma space group and the lattice parameters are about 10.2 Å for "a", 5.9 Å for "b" and 4.7 Å for "c".

Figure 3:
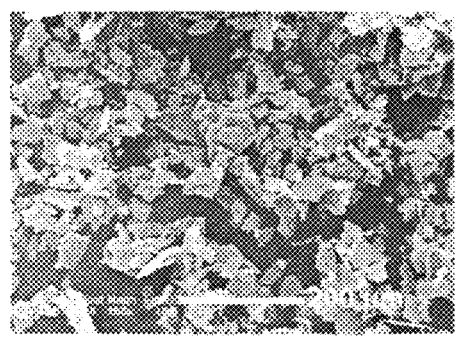
FIGS. 3 and 4 represent two snapshots obtained by scanning electron microscopy, at respective magnifications of 160 times and 2,840 times, of a $LiCoPO_4$ compound obtained according to a particular embodiment of the invention.

However, unlike the $LiCoPO_4$ compounds obtained according to the prior art, the $LiCoPO_4$ compound obtained according to the invention presents a preferential orientation along (h00). In particular, as represented in FIG. 1, the diffraction peak (200) visible around 17.4 2θ° has a considerably higher peak area for plot A than for plot B. This preferential orientation along (h00) is confirmed by the snapshots represented in FIGS. 3 and 4 obtained by scanning electron microscopy (SEM). It can in fact be observed that the synthesized particles are very little agglomerated and in the form of platelets. The particles mostly have a rectangular or square cross-section, with sides measuring about ten micrometers and with a thickness of about 100 nanometers.

Figure 4:
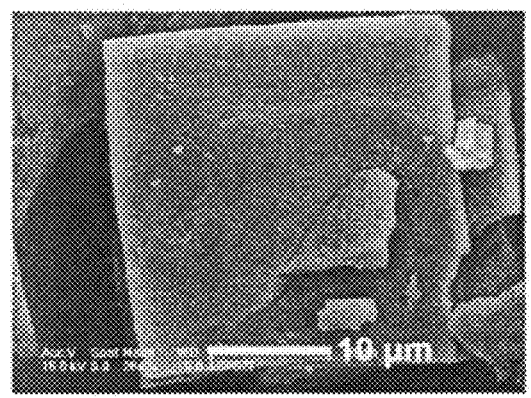
Figure 5:
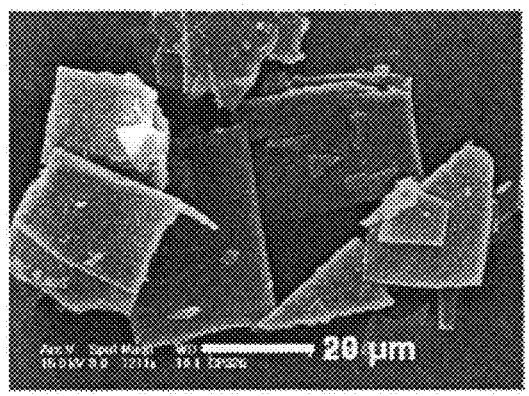
FIGS. 5 and 6 represent two snapshots obtained by scanning electron microscopy, at respective magnifications of 1,211 times and 1,478 times, of the solid precursor $NH_4CoPO_4$, $nH_2O$ used in synthesis of the $LiCoPO_4$ compound.
Figure 6:
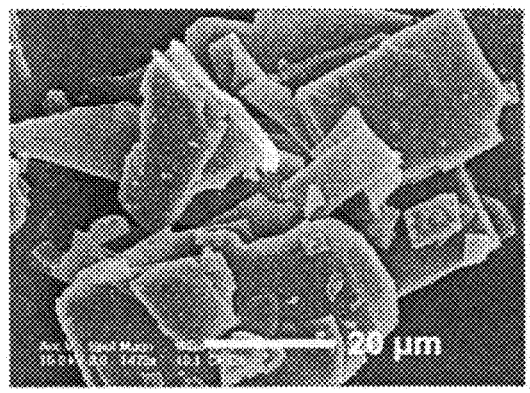

Scanning electron microscopy analyses were also performed for the synthesized $NH_4CoPO_4, nH_2O$ precursor (FIGS. 4 and 5). The particles of said solid precursor are also in the form of platelets and are hardly agglomerated. This proves that the particular morphology observed for the $LiCoPO_4$ particles comes directly from that of the solid $NH_4CoPO_4, nH_2O$ precursor and that the heat treatment performed at low temperature enables this morphology to be preserved.

Furthermore, transformation of $XCoPO_4, nH_2O$ into $LiCoPO_4$ can promote creation of a certain porosity in the $LiCoPO_4$ particles. Numerous pores do in fact appear when the reaction of the $XCoPO_4, nH_2O$ precursor takes place with the precursor forming the lithium source, such as a molten lithium salt. The majority of said pores preferably have a diameter of about 10 nm.

Finally, the synthesized $LiCoPO_4$ compound in the particular example above presents a BET specific surface of $10.1\ m^2/g$ and that of the solid $NH_4CoPO_4, H_2O$ precursor is for this same example of $1.0\ m^2/g$.

It has also been observed that, on account of its particular morphology, the $LiCoPO_4$ compound prepared by reacting the two solid precursors at low temperature exhibits improved electrochemical performances as compared with $LiCoPO_4$ compounds used in the prior art. More particularly, it exhibits a less high electrochemical polarization and a higher output specific capacity on discharge than the $LiCoPO_4$ compounds usually synthesized, without requiring in situ coating with carbon. Moreover, the unusually low synthesis temperature for a Li-Ion storage battery electrode material prevents an excessive and pointless increase of the size of the particles and enables a certain porosity to be preserved.

Such a compound can thus be used as active material of an electrode for lithium storage battery and in particular as active material for the positive electrode. More particularly, the positive electrode of a lithium storage battery can be in the form of an intimate dispersion comprising the synthesized $LiCoPO_4$ compound according to the invention, an electronic conducting additive and possibly an organic binder. Such a dispersion is generally deposited on a metal foil acting as current collector. The electronic conducting additive can be carbon (fibers, nanotubes, platelets, spherical particles, . . . ) and the organic binder designed to provide a good ion conduction and a satisfactory mechanical strength can, for example, be formed by a polymer selected from methyl methacrylate-base, acrylonitrile-base, or vinylidene fluoride-base polymers, as well as polyethers or polyesters.

For illustration purposes, a Li-Ion type lithium storage battery of "button cell" format was provided and tested (FIGS. 7 to 11) using the $LiCoPO_4$ compound, as synthesized according to the particular example mentioned above, as active material for the positive electrode. Such a storage battery thus comprises:
- a negative electrode formed by a lithium disk with diameter of 16 mm and a thickness of 130 µm, deposited on a nickel disk acting as current collector,
- a positive electrode formed by a disk with diameter of 14 mm and a thickness of 25 µm comprising the material of the invention prepared according to the above-mentioned example (80% by weight), carbon black (10% by weight) and polyvinylidene hexafluoride (10% by weight) as binder, the positive electrode being deposited on an aluminum current collector with a thickness of 20 micrometers,
- a separator imbibed with a $LiPF_6$ salt-base (µmol/L) liquid electrolyte in solution in a mixture of propylene carbonate and dimethyl carbonate.

Figure 7:
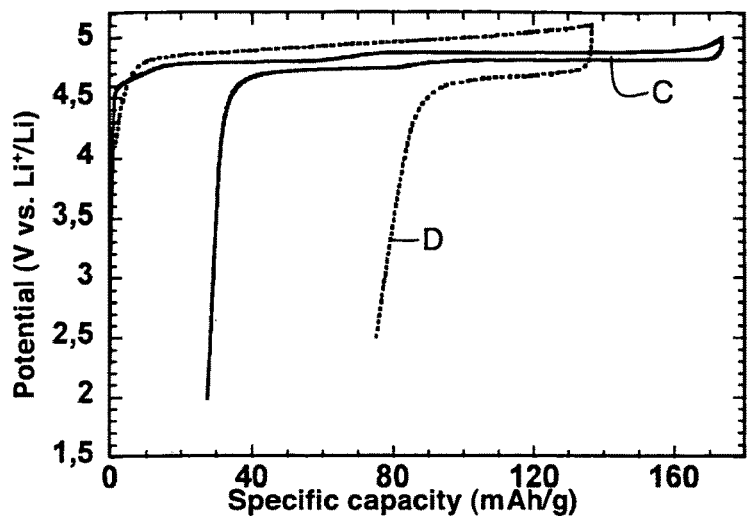
FIG. 7 represents the plots of charging/discharging in constant-current mode, under C/10 conditions, at 20° C., of a lithium storage battery of Li-Ion type respectively comprising the $LiCoPO_4$ compound obtained according to a particular embodiment of the invention and of a $LiCoPO_4$/C composite material obtained according to the prior art.

As represented by curve plot C in FIG. 7 corresponding to the first charging/discharging cycle of the lithium storage battery described above, at 20° C. under C/10 conditions, this enables most of the lithium present in the positive electrode material to be extracted.

Furthermore, the electrochemical characteristics of the compound of the invention are advantageous compared with the prior art, mainly in terms of polarization and of specific capacity output on discharging.

In FIG. 7, curve plot C can be compared with curve plot D corresponding to the first charging/discharging cycle of a lithium storage battery comprising, instead of the $LiCoPO_4$ compound synthesized according to the invention, a composite material comprising $LiCoPO_4$ and 3% by weight of carbon and prepared at 650° C., in argon, by a synthesis called self-combustion synthesis. Observation of the two plots C and D shows that the potential difference between the charging curve and the discharging curve for the lithium storage battery comprising the $LiCoPO_4$ compound synthesized according to the invention, i.e. the internal polarization, is less than for the lithium storage battery comprising the composite material.

Figure 8:
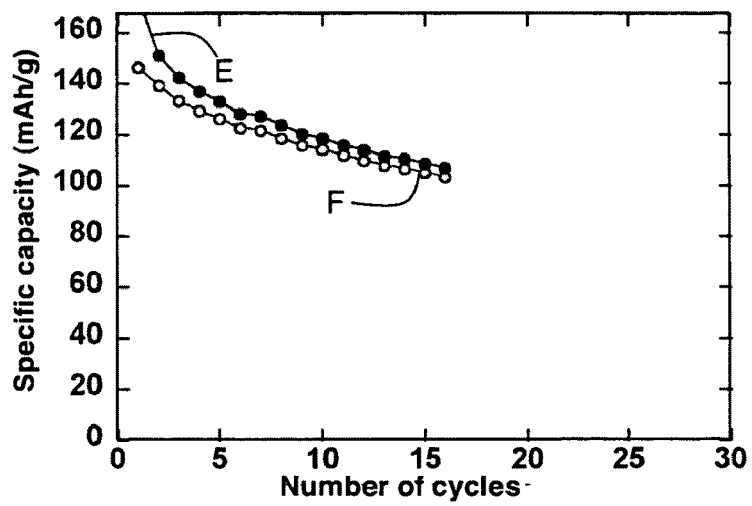
FIG. 8 represents the variation of the specific capacity on charging and on discharging versus the number of cycles performed in the case of the $LiCoPO_4$ compound obtained according to a particular embodiment of the invention.

FIG. 8 represents the variation of the specific capacity on charging (plot E) and on discharging (curve F) of the storage battery versus the number of cycles performed. The evolution of curve plots E and F shows that the specific capacity output on discharging is close to that delivered on charging. Moreover, above 15 cycles, the specific capacities on charging and on discharging remain greater than 100 mAh/g. Finally, the value of the specific capacity on charging after a cycle is about 150 mAh/g, a value which is substantially greater than those reported in prior art studies.

Figure 9:
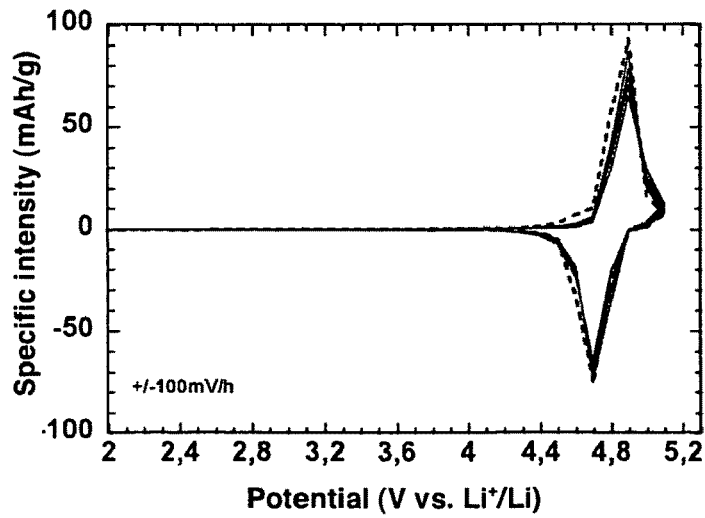
FIGS. 9 and 10 each represent a cycling curve (specific intensity versus potential) plotted in constant-potential mode of a lithium storage battery comprising the $LiCoPO_4$ compound obtained according to a particular embodiment of the invention, with respectively 100 mV/h and 10 mV/h scanning, at 20° C.
Figure 10:
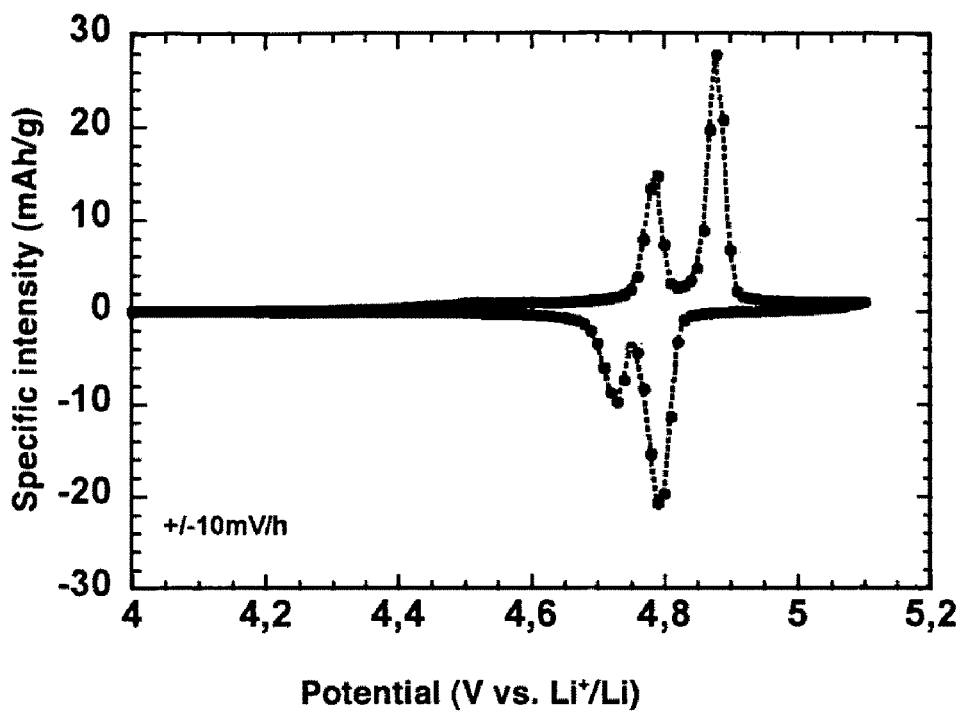

FIG. 9, representing a plot of cyclic voltamperometry (scanning +/−100 mV/h), also shows the very good electrochemical reversibility of the $LiCoPO_4/CoPO_4$ couple in the lithium storage battery according to the particular example mentioned above, as well as its reproducibility in cycling. The cyclic voltamperometry plot represented in FIG. 10 and performed with slower scanning (+/−10 mV/h) enables the presence of two oxidation peaks and two reduction peaks to be clearly distinguished, corresponding to the steps visible on plot C of FIG. 7. The steps therefore occur at a potential of 4.76 V vs $Li^+/Li$ and 4.84 V vs. $Li^+/Li$.

Figure 11:
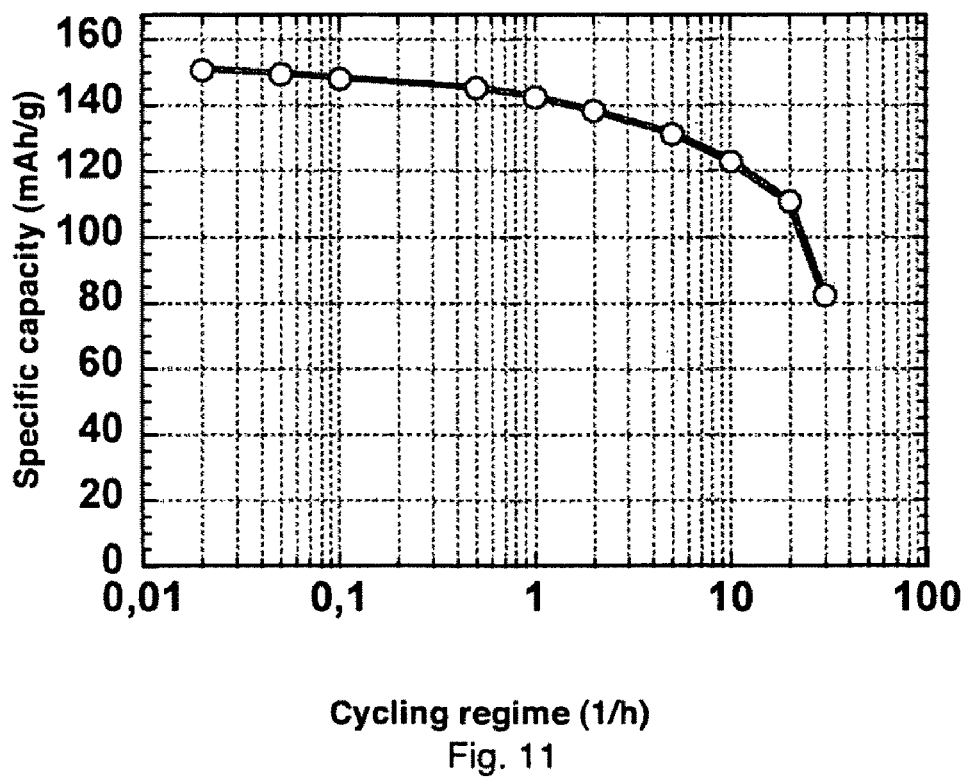
FIG. 11 represents the variation of the specific capacity on discharge versus the cycling regime for a lithium storage battery comprising the $LiCoPO_4$ compound obtained according to a particular embodiment of the invention.

Finally, on account of its particular morphology and its low temperature of preparation, the $LiCoPO_4$ compound synthesized according to the invention enables high capacities to be delivered even under relatively high cycling conditions (FIG. 11). Under "C" discharge conditions (discharging performed in 1 hour), about 140 mAh/g are reached on first discharge (FIG. 11).

Such a synthesis method therefore enables a $LiCoPO_4$ compound exhibiting improved electrochemical performances to be obtained, so that it can be used efficiently as active material for the electrode of a lithium storage battery such as a Li-Ion battery. Such a method is moreover simple to implement. It is also quick as the step or steps to be carried out are of short duration and it requires little energy as it can be performed in air.

Such a synthesis method can also enable $LiCoPO_4$ derivatives to be synthesized. What is meant by $LiCoPO_4$ derivative is a compound presenting a composition mainly of $LiCoPO_4$ type but being able either to contain impurities, or to be doped or replaced by any other element of the periodic table, or to contain vacancies on the lithium, cobalt, phosphorus or oxygen sites. Synthesis of such a $LiCoPO_4$ derivative is then performed, in like manner, using a derivative of the solid first precursor, i.e. a compound mainly presenting a composition of $XCoPO_4$, n $H_2O$ type but able either to contain impurities, or to be doped or replaced by any other element of the periodic table, or to contain vacancies on the X, Co, P or O sites.

Moreover, such a method is not limited to synthesis of $LiCoPO_4$. Indeed, by replacing the solid first precursor $XCoPO_4$, $nH_2O$ or one of its derivatives with $XMPO_4$, $nH_2O$ or one of its derivatives, in which M is a transition metal selected from Ni and Mn, it is possible to synthesize a $LiMPO_4$ compound or one of its derivatives. Such a method using the $LiNO_3$ precursor, on the other hand, does not enable $LiFePO_4$ to be synthesized.

The transition metals Co, Ni and Mn of the first series are in fact known for adopting a structure of olivine type ($LiMPO_4$) by close-related synthesis methods. Thus, the synthesis method described above for $LiCoPO_4$ can be generalized to the other transition metals Ni and Mn. In this case, the solid first precursor $XMPO_4$, $nH_2O$ can be obtained by precipitation when a first water-soluble reagent comprising the transition metal M is added in an aqueous solution containing a second water-soluble reagent comprising phosphorus, then by recovery and drying of said precipitate. The first water-soluble reagent can thus be acetate of transition metal M, oxalate of transition metal M or nitrate of transition metal M. Furthermore, it has been observed that, as for $LiCoPO_4$, the $LiMPO_4$ compounds with M=Ni or Mn and the compounds of one of their derivatives present a BET specific surface greater than or equal to 5 $m^2·g^{-1}$ and that they consist of particles that are hardly agglomerated formed by platelets. Such compounds can also be used as active materials of an electrode for a lithium storage battery.

The invention claimed is:

1. A method for synthesizing a LiMPO$_4$ compound or one of its derivatives, M being a transition metal selected from the group consisting of Co, Ni and Mn, the method comprising at least one step consisting in making lithium nitrate react with a solid precursor formed by XMPO$_4$, nH$_2$O or one of its derivatives and in which —X represents a radical selected from —NH$_4$ and —H and n represents the number of water molecules associated with an XMPO$_4$ entity, at a temperature lower than or equal to 350° C.

2. The method according to claim 1, wherein the temperature is about 300° C.

3. The method according to claim 1, wherein the reaction between the solid precursor and the lithium nitrate is performed in air or in an inert atmosphere.

4. The method according to claim 1, wherein the duration of the reaction between the solid precursor and the lithium nitrate is comprised between one hour and two and a half hours.

5. The method according to claim 1, wherein the reaction between the solid precursor and the lithium nitrate is performed with an excess of lithium.

6. The method according to claim 1, wherein the reaction between the solid precursor and the lithium nitrate is followed by a separation step in which the LiMPO$_4$ compound or one of its derivatives is isolated.

7. The method according to claim 6, wherein the separation step consists in washing the product obtained by the reaction between the solid precursor and the lithium nitrate with distilled water and in drying in air the compound resulting from washing at a temperature comprised between about 50° C. and about 100° C.

8. The method according to claim 1, wherein the solid precursor is obtained by precipitation when a first water-soluble reagent comprising the transition metal M is added in an aqueous solution containing a second water-soluble reagent comprising phosphorus, and then by recovery and drying of said precipitate.

9. The method according to claim 8, wherein the first reagent is selected from the acetate of the transition metal M, the oxalate of the transition metal M and the nitrate of the transition metal M.

10. The method according to claim 8, wherein the second reagent is selected from (NH$_4$)$_2$HPO$_4$ and NH$_4$H$_2$PO$_4$.

* * * * *